(12) United States Patent
Ezoe et al.

(10) Patent No.: US 12,436,091 B2
(45) Date of Patent: Oct. 7, 2025

(54) COLORIMETRIC SYSTEM, TERMINAL DEVICE, INFORMATION PROCESSING DEVICE, AND NON-TRANSITORY COMPUTER-READABLE STORAGE MEDIUM

(71) Applicant: SEIKO EPSON CORPORATION, Tokyo (JP)

(72) Inventors: Takashi Ezoe, Shiojiri (JP); Kanji Kamijima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 23 days.

(21) Appl. No.: 18/457,743

(22) Filed: Aug. 29, 2023

(65) Prior Publication Data

US 2024/0068935 A1    Feb. 29, 2024

(30) Foreign Application Priority Data

Aug. 29, 2022   (JP) ................. 2022-135749

(51) Int. Cl.
*G06T 7/90*   (2017.01)
*G01N 21/25*   (2006.01)

(52) U.S. Cl.
CPC ............. *G01N 21/251* (2013.01); *G06T 7/90* (2017.01); *G06T 2207/10024* (2013.01)

(58) Field of Classification Search
CPC .............. G01N 21/251; G06T 7/90; G06T 2207/10024
USPC ................ 358/1.9, 2.1, 1.18, 504, 538, 1.15
See application file for complete search history.

(56) References Cited

U.S. PATENT DOCUMENTS

| | | | |
|---|---|---|---|
| 2007/0140539 A1 | 6/2007 | Katsumata et al. | |
| 2016/0044209 A1 | 2/2016 | Tsukano | |
| 2018/0027132 A1* | 1/2018 | Yamasaki | H04N 1/00408 |
| | | | 358/504 |
| 2022/0269913 A1 | 8/2022 | Sugiyama et al. | |
| 2023/0353687 A1* | 11/2023 | Shindo | H04N 1/00076 |

FOREIGN PATENT DOCUMENTS

| | | |
|---|---|---|
| JP | 2016001108 A | 1/2016 |
| JP | 2016039421 A | 3/2016 |

OTHER PUBLICATIONS

Office Action for EP Patent Application No. EP23193851.5, issued on Jan. 26, 2024.

* cited by examiner

*Primary Examiner* — Jamares Q Washington
(74) *Attorney, Agent, or Firm* — CHIP LAW GROUP

(57) ABSTRACT

A colorimetric system includes a terminal device and an information processing device. The terminal device includes a transmitter that associates a colorimetric value indicating a color of a colorimetry target subjected to colorimetry by a colorimetric device with accompanying information including at least one of a captured image of the colorimetry target and positional information of the colorimetry target and transmits the colorimetric value and the accompanying information. The information processing device includes a receiver that receives the colorimetric value and the accompanying information, and a display unit that displays the colorimetric value and the accompanying information in a state in which the colorimetric value is associated with the accompanying information.

8 Claims, 6 Drawing Sheets

COLORIMETRIC SYSTEM, TERMINAL DEVICE, INFORMATION PROCESSING DEVICE, AND NON-TRANSITORY COMPUTER-READABLE STORAGE MEDIUM

The present application is based on, and claims priority from JP Application Serial Number 2022-135749, filed Aug. 29, 2022, the disclosures of which is hereby incorporated by reference herein in its entirety.

BACKGROUND

1. Technical Field

The present disclosure relates to a colorimetric system, a terminal device, an information processing device, and a non-transitory computer-readable storage medium storing a program.

2. Related Art

A technique for performing printing with a color subjected to colorimetry is known. As a technique relating to colorimetry, JP-A-2016-39421 discloses a technique in which a reference value that is a color setting value of each patch of a color chart, and history information of a colorimetric value of the patch are stored and a success rate of color reproduction is calculated by comparing the reference value with the colorimetric value.

However, in the existing techniques, it is difficult to identify a colorimetric value corresponding to a predetermined region.

SUMMARY

In order to solve the above-described problem, according to an aspect of the present disclosure, a colorimetric system includes a terminal device and an information processing device. The terminal device includes a transmitter that associates a colorimetric value indicating a color of a colorimetry target subjected to colorimetry by a colorimetric device with accompanying information including at least one of a captured image of the colorimetry target and positional information of the colorimetry target and transmits the colorimetric value and the accompanying information. The information processing device includes a receiver that receives the colorimetric value and the accompanying information, and a display unit that displays the colorimetric value and the accompanying information in a state in which the colorimetric value is associated with the accompanying information.

In addition, in order to solve the above-described problem, according to another aspect of the present disclosure, a terminal device includes a transmitter that associates a colorimetric value indicating a color of a colorimetry target subjected to colorimetry by a colorimetric device with accompanying information including at least one of a captured image of the colorimetry target and positional information of the colorimetry target and transmits the colorimetric value and the accompanying information.

In addition, in order to solve the above-described problem, according to still another aspect of the present disclosure, an information processing device includes a receiver that receives a colorimetric value indicating a color of a colorimetry target subjected to colorimetry by a colorimetric device, and accompanying information including at least one of a captured image of the colorimetry target and positional information of the colorimetry target, and a display unit that displays the colorimetric value and the accompanying information in a state in which the colorimetric value is associated with the accompanying information.

In addition, in order to solve the above-described problem, according to still another aspect of the present disclosure, a non-transitory computer-readable storage medium stores a program for causing a computer to execute associating a colorimetric value indicating a color of a colorimetry target subjected to colorimetry by a colorimetric device with accompanying information including at least one of a captured image of the colorimetry target and positional information of the colorimetry target and transmitting the colorimetric value and the accompanying information.

In addition, in order to solve the above-described problem, according to still another aspect of the present disclosure, a non-transitory computer-readable storage medium stores a program for causing a computer to execute receiving a colorimetric value indicating a color of a colorimetry target subjected to colorimetry by a colorimetric device, and accompanying information including at least one of a captured image of the colorimetry target and positional information of the colorimetry target, and displaying the colorimetric value and the accompanying information in a state in which the colorimetric value is associated with the accompanying information.

DESCRIPTION OF EMBODIMENTS

Embodiments

Figure 1:
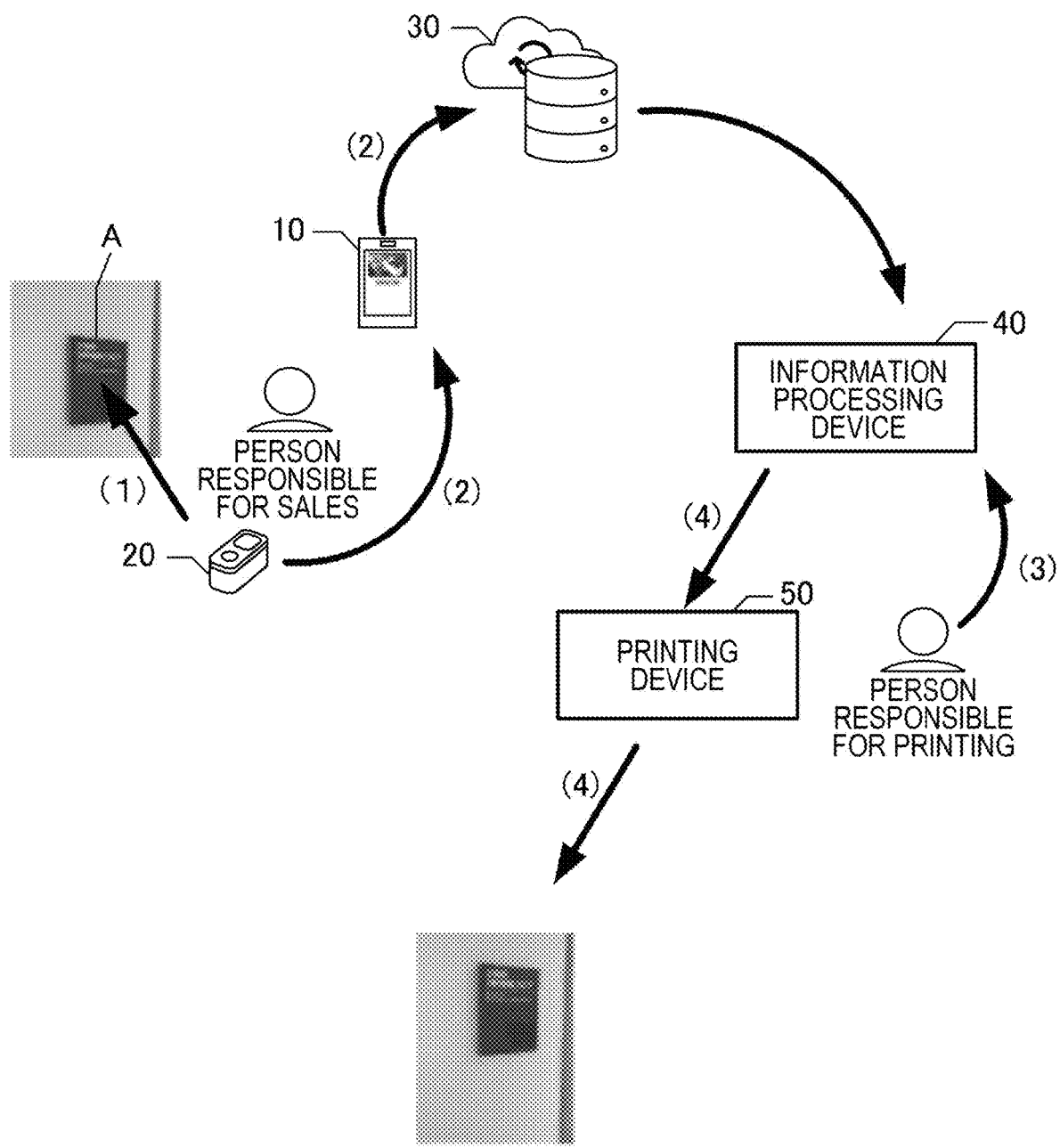
FIG. 1 is a diagram for explaining an outline of a colorimetric system.

FIG. 1 a diagram for explaining an outline of a process of a colorimetric system 1 according to an embodiment of the present disclosure. The colorimetric system 1 prints a colorimetry target A based on a colorimetric value of the colorimetry target A. The colorimetry target A is, for example, a poster, a signboard, a sign, or the like. The colorimetric system 1 is used to reproduce a color of an already existing poster and the like. Specifically, first, (1) an operator such as a person responsible for sales uses a colorimetric device 10 to perform colorimetry on the colorimetry target A. Next, (2) the colorimetric value is transmitted to a server device 30 such as a cloud server via a terminal device 20 owned by the person responsible for sales. Then, (3) a person responsible for printing uses an information processing device 40 to select, from among colorimetric values stored in the server device 30, the colorimetric value to be used for printing a print object corresponding to the colorimetry target A. Thereafter, (4) a printing device 50 prints the colorimetry target A based on the colorimetric value selected by the person responsible for printing.

Figure 2:
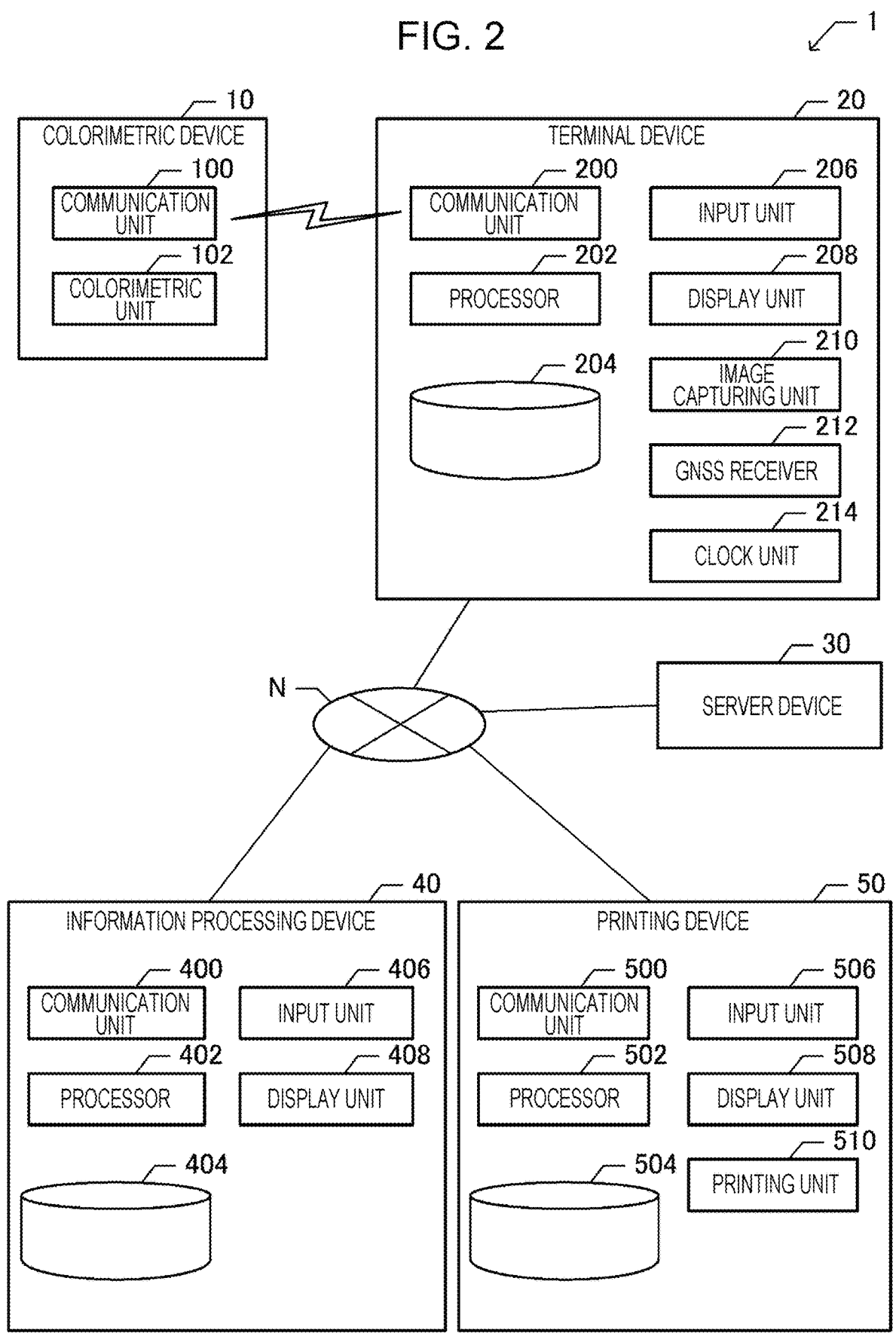
FIG. 2 is a configuration diagram of the colorimetric system.

FIG. 2 is a schematic configuration diagram of the colorimetric system 1. The colorimetric system 1 includes the colorimetric device 10, the terminal device 20, the server device 30, the information processing device 40, and the printing device 50. The colorimetric device 10 obtains a colorimetric value (Lab value). The terminal device 20 is a mobile information processing device. For example, the terminal device 20 is a smartphone or the like. The colorimetric device 10 and the terminal device 20 are owned by an administrator who is the person responsible for sales or the like and performs colorimetry. The server device 30 acquires the colorimetric value and the like via the terminal device 20 and stores the acquired colorimetric value and the like. The information processing device 40 acquires the colorimetric value stored in the server device 30 and instructs the printing device 50 to perform printing with the specified colorimetric value. The colorimetric device 10 and the terminal device 20 perform near-field communication with each other via, for example, Bluetooth (registered trademark) or the like. The terminal device 20, the server device 30, the information processing device 40, and the printing device 50 communicate with each other via a network N. The network N is not particularly limited and may be the Internet, a local network, or the like, for example.

The colorimetric device 10 includes a communication unit 100 and a colorimetric unit 102. The communication unit 100 performs near-field communication with the terminal device 20. The colorimetric unit 102 executes colorimetry to obtain a colorimetric value.

The terminal device 20 includes a communication unit 200, a processor 202, a nonvolatile memory 204, an input unit 206, a display unit 208, an image capturing unit 210, a GNSS receiver 212, and a clock unit 214. The communication unit 200 communicates with an external device in accordance with various communication protocols for wired or wireless communication. The communication unit 200 performs near-field communication with the colorimetric device 10 and communicates with another device such as the server device 30 via the network N. The communication unit 200 is an example of a transmitter and is an example of a receiver.

The processor 202 includes a CPU, a ROM, a RAM, and the like not illustrated and executes various programs stored in the nonvolatile memory 204 so as to control the units of the terminal device 20. The processor 202 may be a single chip or may be a plurality of chips. In addition, for example, the processor 202 may include an ASIC instead of the CPU. Alternatively, the processor 202 may have a configuration in which the CPU and an ASIC cooperate with each other. Various types of information and various programs are stored in the nonvolatile memory 204. The input unit 206 is a device for receiving input by a user. The input unit 206 is an operational button, a touch panel, or the like. The display unit 208 displays various types of information. The image capturing unit 210 captures an image. The GNSS receiver 212 is a device that receives a signal of a global navigation satellite system (GNSS). The GNSS receiver 212 receives a radio wave from the global navigation satellite system and outputs a signal for calculating the position of the operator. The clock unit 214 measures a date and time.

The information processing device 40 includes a communication unit 400, a processor 402, a nonvolatile memory 404, an input unit 406, and a display unit 408. The communication unit 400 communicates with other devices such as the server device 30 and the printing device 50 via the network N. The processor 402, the nonvolatile memory 404, the input unit 406, and the display unit 408 are identical or similar to the processor 202, the nonvolatile memory 204, the input unit 206, and the display unit 208 of the terminal device 20, respectively. The input unit 206 may be a keyboard or the like.

The printing device 50 includes a communication unit 500, a processor 502, a nonvolatile memory 504, an input unit 506, a display unit 508, and a printing unit 510. The communication unit 500 communicates with another device such as the information processing device 40 via the network N. The processor 502, the nonvolatile memory 504, the input unit 506, and the display unit 508 are identical or similar to the processor 202, the nonvolatile memory 204, the input unit 206, and the display unit 208 of the terminal device 20, respectively. The printing unit 510 performs printing according to one or more of various printing methods including an ink jet method and an electrophotographic method.

Figure 3:
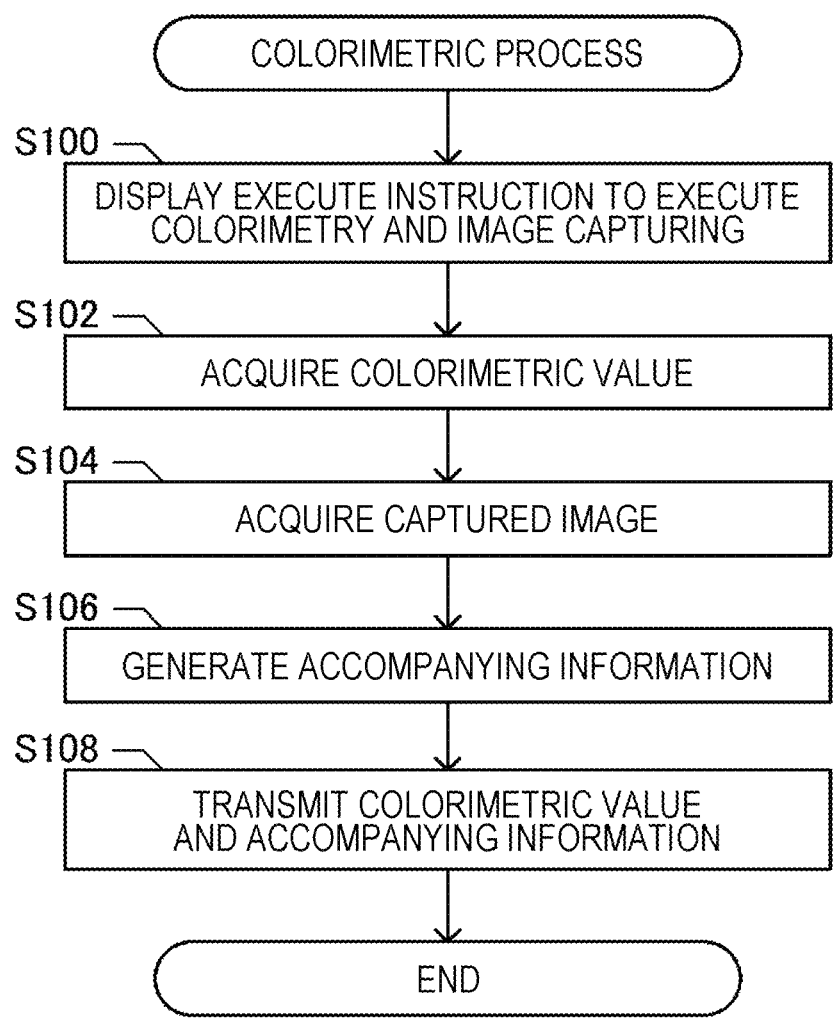
FIG. 3 is a flowchart illustrating a colorimetric process.

FIG. 3 is a flowchart illustrating a colorimetric process by the terminal device 20. The colorimetric process is performed when the person responsible for sales performs colorimetry on the colorimetry target A. The colorimetric process corresponds to (1) and (2) described above with reference to FIG. 1.

The colorimetric process is started, for example, when a button (not illustrated) for starting the colorimetric process is pressed by the person responsible for sales. In the colorimetric process, first, the processor 202 causes the display unit 208 to display an execution instruction to execute colorimetry by the colorimetric device 10 and image capturing (step S100). Specifically, the processor 202 causes the display unit 208 to display text information indicating that "Please use the colorimetric device to execute colorimetry, and capture an image including the colorimetric device executing the colorimetry and the colorimetry target" or the like. The display unit 208 is an example of an output unit. This processing is an example of processing of outputting an execution instruction to execute colorimetry by the colorimetric device 10 and image capturing by the image capturing unit 210.

Next, the processor 202 acquires a colorimetric value from the colorimetric device 10 via the communication unit 200 (step S102). The person responsible for sales places the colorimetric device 10 on the colorimetry target A and performs an operation of starting colorimetry. In response to this operation, the colorimetric value obtained by the colorimetric device 10 is transmitted from the colorimetric device 10 to the terminal device 20 via near-field communication.

Next, the processor 202 acquires an image captured by the image capturing unit 210 in response to an operation performed on the input unit 206 by the person responsible for sales (step S104). It is assumed that the person responsible for sales uses the terminal device 20 to capture the image including the colorimetric device 10 and the colorimetry target A in a state in which the colorimetric device 10 is placed on the colorimetry target A. In step S104, the image captured by the image capturing unit 210 in the above-described manner is acquired.

Next, the processor 202 generates accompanying information (step S106). The accompanying information is information accompanying the colorimetric value and including information relating to the colorimetric value. In the present embodiment, the accompanying information includes the captured image acquired in step S104, an image capturing date and time when the image was captured, and positional information (colorimetric point) of the colorimetry target A. The image capturing date and time when the image was captured is a value measured by the clock unit 214. The positional information is identified based on a signal received by the GNSS receiver 212.

Next, the processor 202 associates the colorimetric value with the accompanying information and transmits the colorimetric value and the accompanying information to the server device 30 via the communication unit 200 (step S108). The colorimetric value and the accompanying information are stored in the server device 30 in a state in which the colorimetric value is associated with the accompanying information. Specifically, the processor 202 associates the colorimetric value received from the colorimetric device 10 after the output of the execution instruction with the accompanying information including the image captured by the image capturing unit 210 after the output of the execution instruction and transmits the colorimetric value and the accompanying information. Thereafter, the colorimetric process ends.

When the colorimetry target A includes a plurality of regions of different colors, the person responsible for sales performs colorimetry on each of the regions. In response to the colorimetry, the colorimetric process is performed on each of the regions. In addition, the person responsible for sales performs colorimetry on a plurality of colorimetry targets, and in response to the colorimetry, the colorimetric process is performed on the plurality of colorimetry targets. By the process described above, a colorimetric value and accompanying information are associated with each other and stored in the server device 30 for each of the plurality of colorimetry targets. In addition, when a colorimetry target includes a plurality of regions of different colors, a colorimetric value and accompanying information are associated with each other and stored in the server device 30 for each of the regions.

Since the plurality of colorimetric values are stored in the server device 30 as described above, there is a possibility that colorimetric values of different regions may be incorrectly applied for printing of a colorimetry target. In the present embodiment, it is possible to prevent a colorimetric value from being incorrectly applied in the following process.

Figure 4:
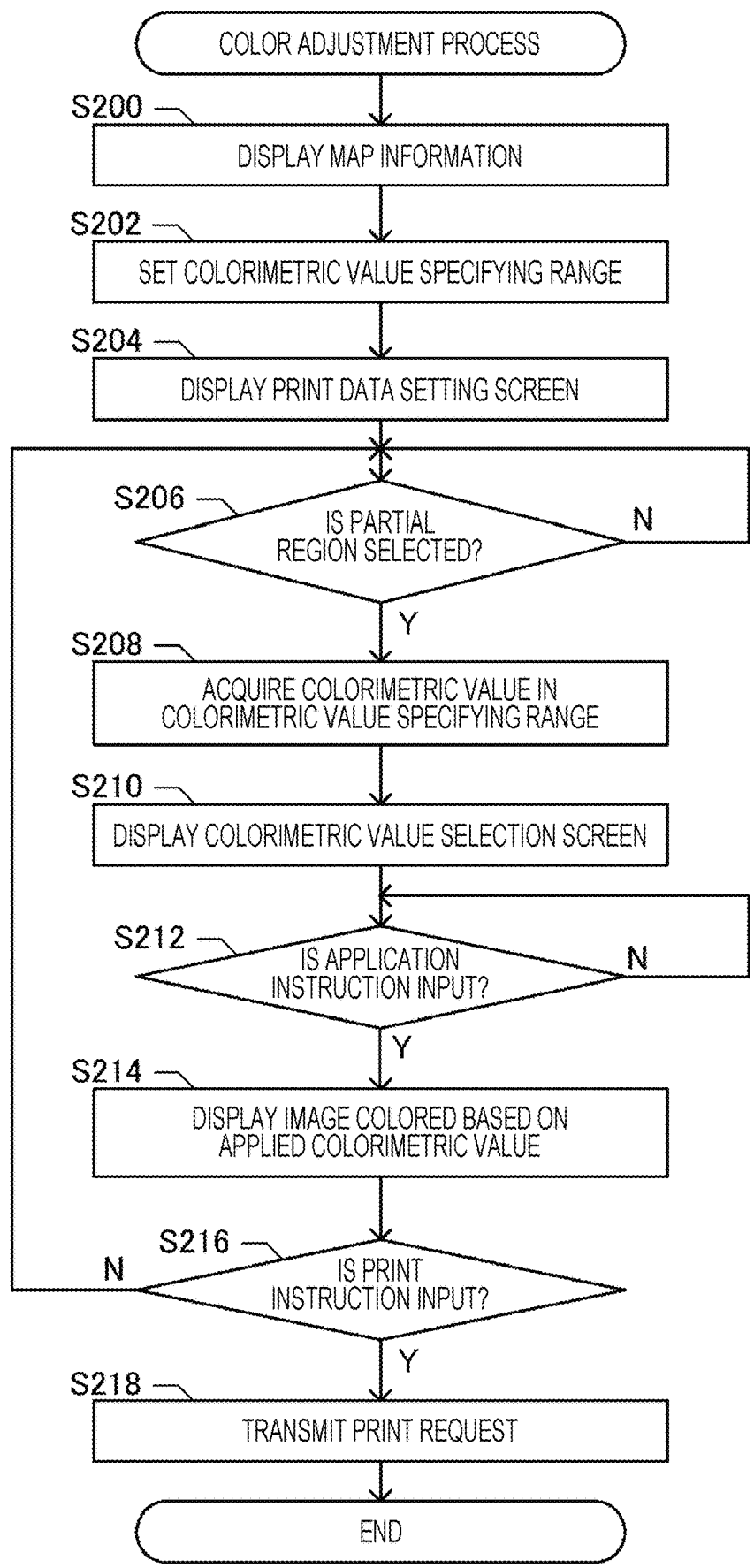
FIG. 4 is a flowchart illustrating a color adjustment process.

FIG. 4 is a flowchart illustrating a color adjustment process by the information processing device 40. The color adjustment process is performed when the person responsible for printing performs printing corresponding to the colorimetry target A. The color adjustment process corresponds to (3) and (4) described with reference to FIG. 1.

In the color adjustment process, first, the processor 402 causes the display unit 408 to display map information (step S200). It is assumed that the map information is stored in the nonvolatile memory 404 of the information processing device 40 in advance. The processor 402 references the positional information stored in the server device 30 and indicated in the accompanying information corresponding to the colorimetric value and causes the display unit 408 and causes the display unit 408 to display the map information in a range including colorimetric points corresponding to a plurality of colorimetric values.

Next, when the person responsible for printing specifies, on a map displayed by the display unit 408, a range including the colorimetry target A scheduled to be printed, the processor 402 receives the range specified by the person responsible for printing via the input unit 406. Then, the processor 402 sets the received range as a colorimetric value specifying range (step S202).

For example, it is assumed that a colorimetric value corresponding to a colorimetric point that is in a region X and where colorimetry was performed on a certain day, and a colorimetric value corresponding to a colorimetric point in a region Y and where colorimetry was performed on the certain day are stored in the server device 30. In this case, in step S200, map information of a range including the region X and the region Y is displayed. When a colorimetry target that corresponds to the colorimetric value obtained from the colorimetric point in the region X is scheduled to be printed, the person responsible for printing specifies a range including the region X and not including the region Y via the input unit 406. In response to the specifying, in step S202, the range including the region X and not including the Y is set as the colorimetric value specifying range.

Next, the processor 402 causes the display unit 408 to display a print data setting screen (step S204). The print data setting screen is a screen for setting, by an operation performed by the person responsible for printing via the input unit 406, the size of the colorimetry target A to be printed, a printing position where the colorimetry target A is printed on a print medium (for example, roll paper), and color information. It is assumed that the shape of the colorimetry target A and color information (initial values) of each of regions included in the colorimetry target A are provided from, for example, a person requesting the printing or the like and are registered in the information processing device 40 in advance.

Figure 5:
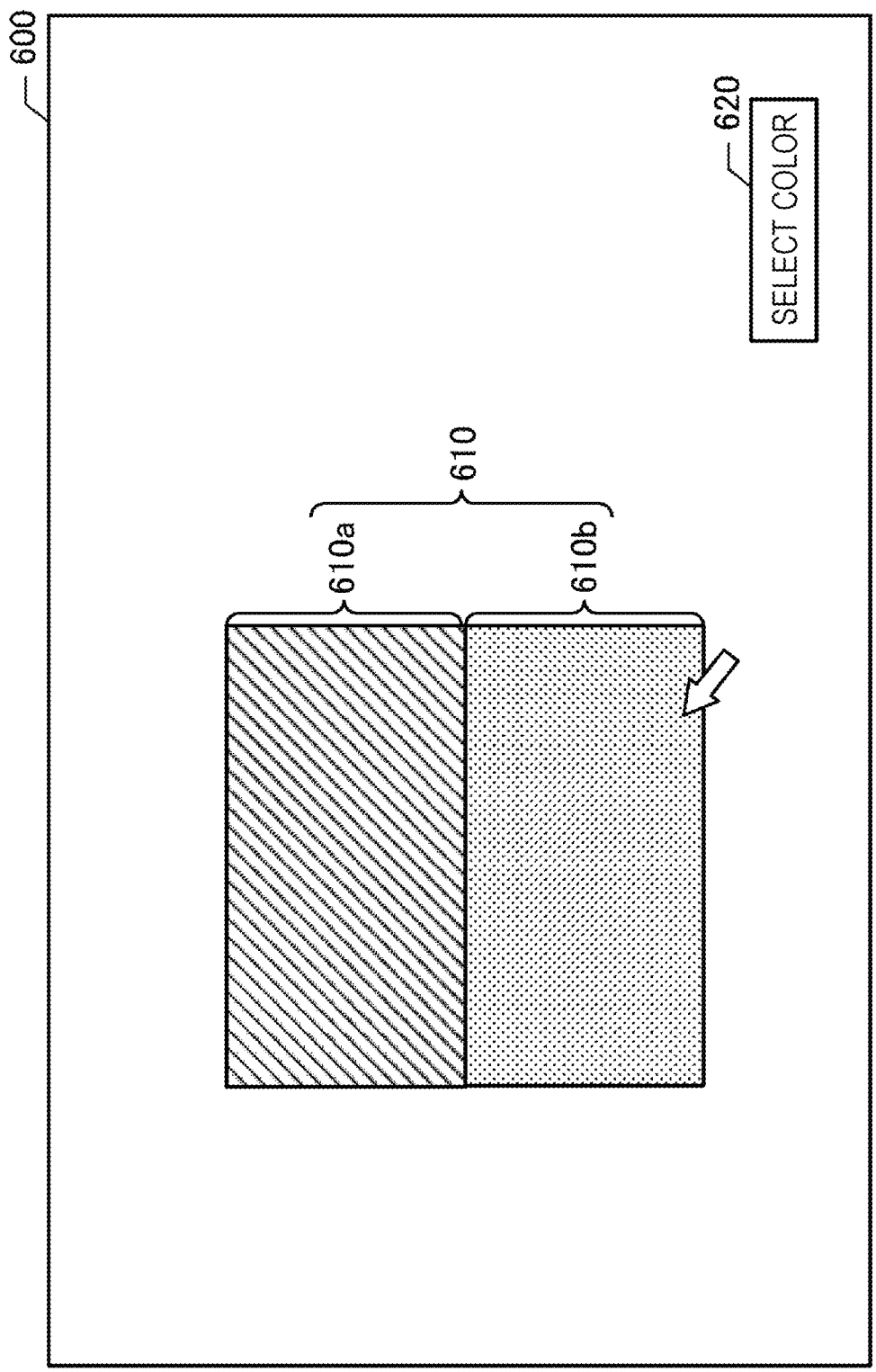
FIG. 5 is a diagram illustrating an example of a displayed print data setting screen.

FIG. 5 is a diagram illustrating an example of the print data setting screen. On the print data setting screen 600, an approximate image of print data corresponding to the colorimetry target A is displayed. For example, when the colorimetry target A is a rectangle with two vertically divided regions of different two colors, an approximate image 610 of print data that is in a rectangle shape and has two vertically divided regions 610a and 610b of two colors is displayed as illustrated in FIG. 5. The upper region 610a and the lower region 610b of the approximate image 610 are displayed with the colors corresponding to initial values of color information. However, the colors indicated by the initial values of the color information may be different from actual colors of regions of the colorimetry target A. This is due to the fact that the initial values of the color information are color values in a captured image of the colorimetry target A and are different from the actual color values due to the intensity of light, for example. The differences between the colors are corrected by processing of step S206 and the subsequent steps.

After the processing of step S204, the processor 402 stands by until a partial region of the colorimetry target is selected by the person responsible for printing via the input unit 406 (N in step S206). When the partial region is selected (Y in step S206), the processor 402 causes the process to proceed to step S208. The partial region is a partial range in the colorimetry target and indicated with the same color. In the approximate image 610 illustrated in FIG. 6, the upper region 610a and the lower region 610b are partial regions. For example, when the person responsible for printing selects a select color button 620 in a state in which the lower region 610b is selected, the processor 402 determines that the lower region 610b was selected.

Thereafter, in step S208, the processor 402 acquires (receives), from the server device 30 via the communication unit 400, a colorimetric value corresponding to a colorimetric point included in the colorimetric value specifying range, and accompanying information corresponding to the colorimetric value. For example, when the region X is specified as the colorimetric value specifying range, the colorimetric value corresponding to the colorimetric point included in the region X is acquired.

Next, the processor 402 causes the display unit 408 to display a colorimetric value selection screen (step S210). The colorimetric value selection screen is a screen for selecting, by an operation performed by the person responsible for printing via the input unit 406, a colorimetric value to be applied to a partial region being selected. On the colorimetric value selection screen, a color patch indicating a color corresponding to the colorimetric value acquired in step S208 is displayed. That is, on the colorimetric value selection screen, the color patch of the colorimetric value corresponding to the colorimetric point in the range specified on the map information is displayed.

Figure 6:
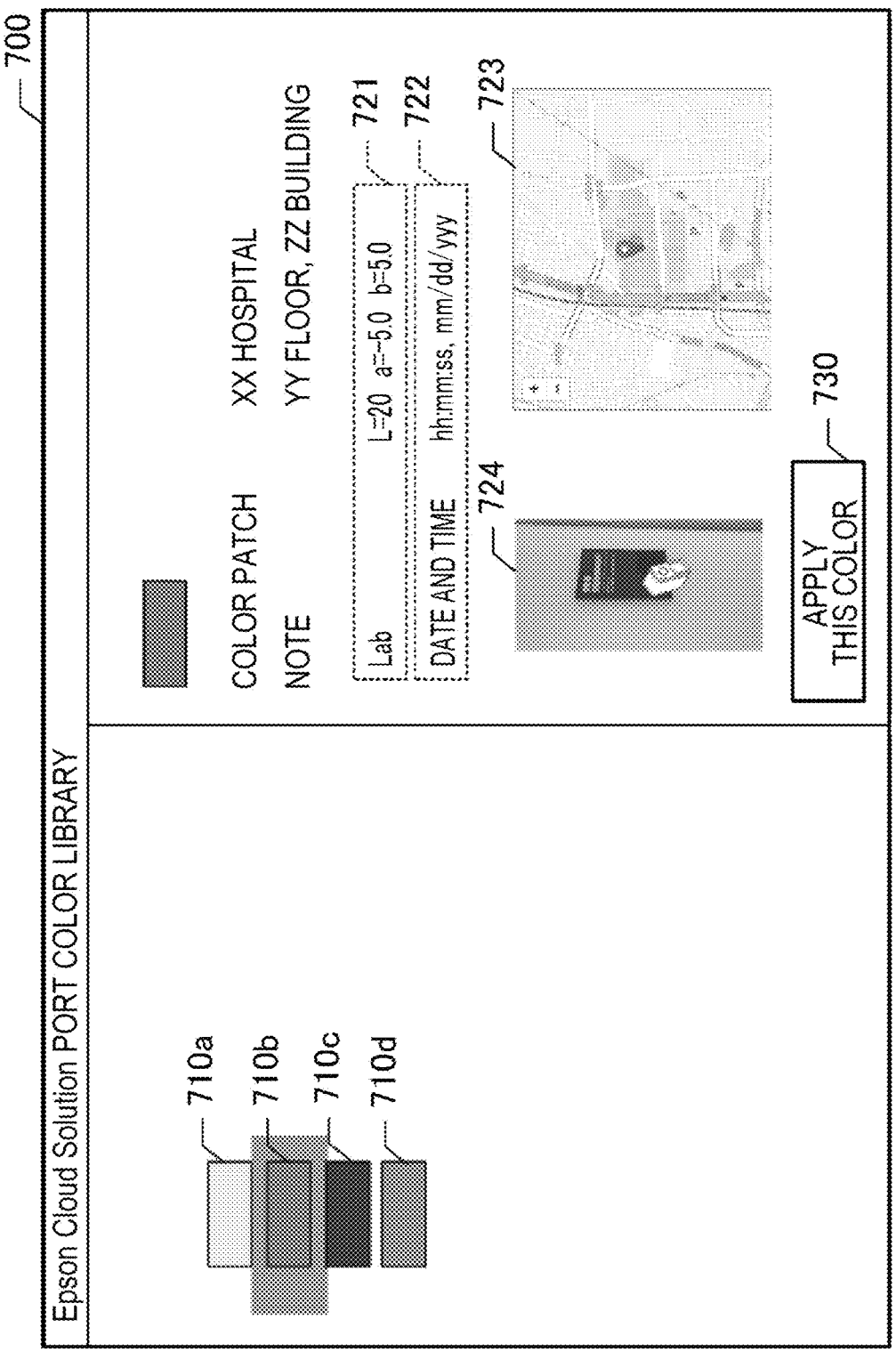
FIG. 6 is a diagram illustrating an example of a displayed colorimetric value selection screen.

FIG. 6 is a diagram illustrating an example of the colorimetric value selection screen. In a field on the left side in the colorimetric value selection screen 700, color patches 710a to 710d corresponding to colorimetric values acquired in S208 and corresponding to a colorimetric point in the colorimetric value specifying range are displayed. In this case, when the color patch 710b is selected, accompanying information corresponding to the selected color patch 710b is displayed in a field on the right side in the colorimetric value selection screen 700. Specifically, in the field on the right side, a colorimetric value 721 corresponding to the selected color patch 710b and an image capturing date and time 722 corresponding to the selected color patch 710b are displayed. In addition, in the field on the right side, a map image 723 indicating the colorimetric point and corresponding to the selected color patch 710b and a captured image 724 corresponding to the selected color patch 710b are displayed. In this manner, the colorimetric value and the accompanying information are displayed in a state in which the colorimetric value is associated with the accompanying information.

Since not only information of a color indicated by the color patch 710b but also the accompanying information associated with the colorimetric value are displayed, the person responsible for printing can select, based on the displayed information, a colorimetric value to be applied to a partial region being selected. When a colorimetric value is selected based on only information of a color, and a plurality of colorimetric values corresponding to similar colors are present, there is a possibility that the selected colorimetric value may be incorrect. On the other hand, in the present embodiment, since a colorimetric point is indicated, for example, it is possible to clearly distinguish a colorimetric value of an S hospital from a colorimetric value of a T beauty salon.

In addition, as indicated by the captured image 724 illustrated in FIG. 6, the captured image includes an image of the colorimetric device 10 and an image of the colorimetry target A. Therefore, the person responsible for printing can check a positional relationship between the colorimetric device 10 and the colorimetry target A in the captured image 724 and accurately grasp which partial region of the colorimetry target A the colorimetric value corresponds to. For example, in the example illustrated in FIG. 6, since it is possible to visually recognize that the colorimetric device 10 is placed on a lower region of the colorimetry target A in the captured image 724, it can be found that the colorimetric value (color patch 710b) being selected is a colorimetric value of the lower region of the colorimetry target A.

The person responsible for printing selects a color patch, checks accompanying information corresponding to the selected color patch, and identifies a colorimetric value to be applied. After identifying the colorimetric value, the person responsible for printing selects a button 730 indicating "Apply this color" in a state in which the color patch is selected. In response to the selection of the button 730, an application instruction is input to the information processing device 40.

In FIG. 6, after the processing of step S210, in step S212, the processor 402 stands by until the application instruction is input to the information processing device 40 (N in step S212). When the application instruction is input to the information processing device 40 (Y in step S212), the processor 402 causes the process to proceed to step S214. In step S214, the processor 402 transitions the displayed screen to the print data setting screen 600 and causes the display unit 408 to display, on the print data setting screen 600, the approximate image 610 colored based on the colorimetric value corresponding to the application instruction. Therefore, the person responsible for printing can check the state of the approximate image 610 colored based on the selected colorimetric value.

Next, the processor 402 checks whether a print instruction is input to the information processing device 40 via the input unit 406 (step S216). When the print instruction is not input to the information processing device 40 via the input unit 406 (N in step S216), the processor 402 causes the process to proceed to step S206. By repeating the processing of steps S206 to S216, colorimetric values are applied to all partial regions included in the colorimetry target A. When the print instruction is input to the information processing device 40 via the input unit 406 (Y in step S216), the processor 402 causes the process to proceed to step S218. In step S218, the processor 402 transmits, to the printing device 50, a print request and print data including the colorimetric values applied to the partial regions as color information of the partial regions. Upon receiving the print request and the print data, the printing device 50 performs printing based on the print data so as to obtain a printed object corresponding to the colorimetry target. Thereafter, the color adjustment process ends.

In the colorimetric system 1 according to the present embodiment, a colorimetric value and accompanying information are recorded and are displayed for printing in a state in which the colorimetric value is associated with the accompanying information. Therefore, even when a plurality of colorimetric values to be applied to a plurality of regions are present, the person responsible for printing can easily identify the regions to which the colorimetric values are to be applied.

APPENDICES

The above-described embodiment is an example of the present disclosure, and other various embodiments can be implemented.

As a first modification, although the colorimetric values and the accompanying information are stored in the server device 30 in the above-described embodiment, a location where the colorimetric values and the accompanying information are stored is not limited to that described in the embodiment. As another example, the colorimetric values and the accompanying information may be stored in the information processing device 40. In addition, the colorimetric device 10 and the terminal device 20 may be integrated into a single device, and the image capturing unit 210 may be provided as a device separate from the single device.

As a second modification, a specific form in which the colorimetric values and the accompanying information are displayed is not limited to that described in the embodiment since it suffices for the colorimetric values and the accompanying information to be displayed on the colorimetric value selection screen in a state in which the colorimetric values are associated with the accompanying information. For example, a list of a colorimetric value, a colorimetric point, and an image capturing date and time may be displayed, and when the colorimetric value is selected, the captured image may be displayed.

As a third modification, the accompanying information may include at least one of the captured image of the colorimetry target and the positional information of the colorimetry target. For example, even when the accompanying information includes only the captured image or the positional information, it is possible to narrow down a plurality of colorimetric values to a colorimetric value to be applied to a predetermined region. Meanwhile, the accompanying information may include text information entered by the person responsible for sales. For example, when the person responsible for sales performs colorimetry on each of a plurality of floors in the same building, the person responsible for sales enters, as text information, information of the floors subjected to the colorimetry. Therefore, the person responsible for printing can reference the information entered by the person responsible for sales and identify colorimetric values.

A fourth modification is described below. In the present embodiment, in the colorimetric process illustrated in FIG. 3, the execution instruction to execute the colorimetry by the colorimetric device 10 and the image capturing by the image capturing unit 210 is displayed by the display unit 208. However, it suffices for the execution instruction to be output from the output unit and the form in which the execution instruction is output is not limited to that described in the embodiment. As another example, when the terminal device 20 includes a speaker, a sound of the execution instruction may be output from the speaker.

As a fifth modification, when a partial region is selected on the print data setting screen 600, the information processing device 40 may automatically extract a colorimetric value to be applied to the selected partial region and display an approximate image in which the extracted colorimetric value is reflected. Specifically, when the colorimetric value is stored in the server device 30, the processor 402 identifies a partial image of the colorimetry target in print data corresponding to the colorimetric value in the information processing device 40. Thereafter, the processor 402 associates the colorimetric value with the partial region in the print data and stores the colorimetric value and the partial region to the nonvolatile memory 404. Therefore, when the partial region is selected, the processor 402 can cause the display unit 408 to display the approximate image to which the colorimetric value associated with the selected partial region is applied.

The process of associating the partial region with the colorimetric value may be implemented in the following manner. That is, first, the processor 402 extracts the image of the colorimetric device based on an image feature in the captured image and identifies, as a region corresponding to the colorimetric value, a region corresponding to the colorimetric device and included in the colorimetry target from a positional relationship between the image of the colorimetric device and the image of the colorimetry target. Thereafter, the processor 402 performs matching of the partial region in the print data and a region corresponding to the partial region and included in the captured image based on a feature of the identified region. Thereafter, the processor 402 associates the partial region included in the print data and determined to be the same as the region in the captured image with the colorimetric value of the region in the captured image. The image of the colorimetric device may be extracted using a technique for deep learning.

In addition, as another example, the information processing device 40 may automatically extract colorimetric values to be applied to the partial regions included in the print data corresponding to the colorimetry target and display, on the displayed print data setting screen 600, an approximate image in which the extracted colorimetric values are reflected. In this case, the processing may be performed using matching based on a feature of the image or the technique for deep learning in such a manner as described above.

In addition, the present disclosure may be applied as a program to be executed by a computer and a method. The system described above, the program, and the method may be implemented as a single device or may be implemented using components included in a plurality of devices and include various aspects. In addition, the system, the program, and the method can be appropriately modified such that a part of the system, a part of the program, and a part of the method are implemented by software and that a part of the system, a part of the program, and a part of the method are implemented by hardware, for example. In addition, the present disclosure may be implemented as a storage medium storing a program for controlling the system. The storage medium storing the program may be a magnetic storage medium or a semiconductor memory. Any storage medium that will be developed in the future can be considered in exactly the same manner as the storage medium storing the program.

In addition, the above-described embodiments do not limit the present disclosure. Since the embodiments include the plurality of techniques that provide different effects, a single purpose and a single effect that can be read from the embodiments are not necessarily the purposes and the effects for all of the techniques included in the embodiments.

What is claimed is:

1. A colorimetric system, comprising:
a terminal device that includes a transmitter configured to:
associate a colorimetric value indicating a color of a colorimetry target subjected to colorimetry by a colorimetric device with accompanying information, wherein the accompanying information includes:
a captured image of the colorimetry target, and
positional information of the colorimetry target indicating a geographic location of the colorimetry target; and
transmit the colorimetric value and the accompanying information; and
an information processing device that includes:
a receiver configured to receive the colorimetric value and the accompanying information; and
a display unit configured to display the colorimetric value and the accompanying information in a state in which the colorimetric value is associated with the accompanying information.

2. The colorimetric system according to claim 1, wherein the terminal device further includes an output unit configured to output an execution instruction to execute the colorimetry by the colorimetric device and image capturing by an image capturing unit, and
the transmitter of the terminal device is further configured to associate the colorimetric value acquired from the colorimetric device after the output of the execution instruction with the accompanying information including the image captured by the image capturing unit after the output of the execution instruction and transmit the colorimetric value and the accompanying information.

3. The colorimetric system according to claim 1, wherein
the captured image includes an image of the colorimetric device,
the image of the colorimetric device indicates the colorimetry target that is subjected to the colorimetry by the colorimetric device,
in a case where a portion of the colorimetry target is selected according to a user operation, the display unit of the information processing device is further configured to display the colorimetric value corresponding to the portion and identified based on a positional relationship between the image of the colorimetric device and an image of the colorimetry target, and
the image of the colorimetric device and the image of the colorimetry target are included in the captured image.

4. The colorimetric system according to claim 1, wherein
the captured image includes an image of the colorimetric device,
the image of the colorimetric device indicates the colorimetry target that is subjected to the colorimetry by the colorimetric device,
the display unit of the information processing device is further configured to display the colorimetric value of a plurality of regions in the colorimetry target in a state in which the colorimetric value is associated with a respective region of the plurality of the regions,
the colorimetric value is identified based on a positional relationship between the image of the colorimetric device and an image of the colorimetry target, and
the image of the colorimetric device and the image of the colorimetry target are included in the captured image.

5. The colorimetric system according to claim 1, wherein
the display unit of the information processing device is further configured to display map information, and
in a case where a range on the map information is specified according to a user operation, the display unit is further configured to display the colorimetric value corresponding to the positional information within the specified range.

6. A terminal device, comprising:
a transmitter configured to:
associate a colorimetric value indicating a color of a colorimetry target subjected to colorimetry by a colorimetric device with accompanying information, wherein the accompanying information includes:
a captured image of the colorimetry target, and
positional information of the colorimetry target indicating a geographic location of the colorimetry target; and
transmit the colorimetric value and the accompanying information.

7. The terminal device according to claim 6, further comprising an output unit configured to output an execution instruction to execute the colorimetry by the colorimetric device and image capturing unit, wherein
the transmitter is further configured to associate the colorimetric value received from the colorimetric device after the output of the execution instruction with the accompanying information including the image captured by the image capturing unit after the output of the execution instruction and transmit the colorimetric value and the accompanying information.

8. An information processing device, comprising:
a receiver configured to receive a colorimetric value indicating a color of a colorimetry target subjected to colorimetry by a colorimetric device, and accompanying information including:
a captured image of the colorimetry target, and
positional information of the colorimetry target indicating a geographic location of the colorimetry target; and
a display unit configured to display the colorimetric value and the accompanying information in a state in which the colorimetric value is associated with the accompanying information.

\* \* \* \* \*